W. EBERHARD.
Oatmeal-Machine.
No. 228,520. Patented June 8, 1880.
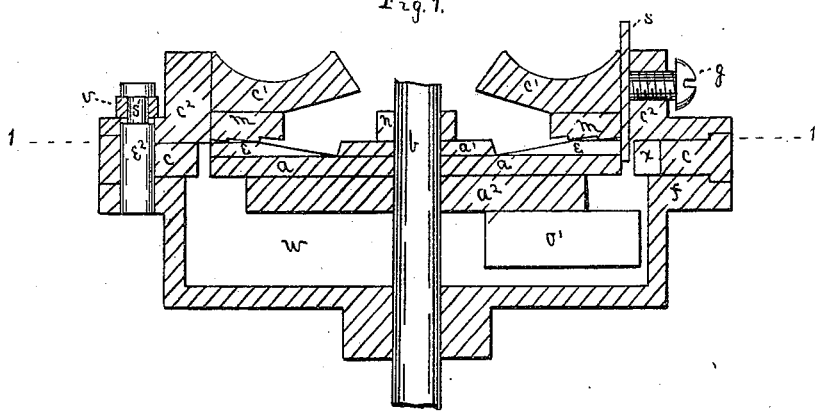
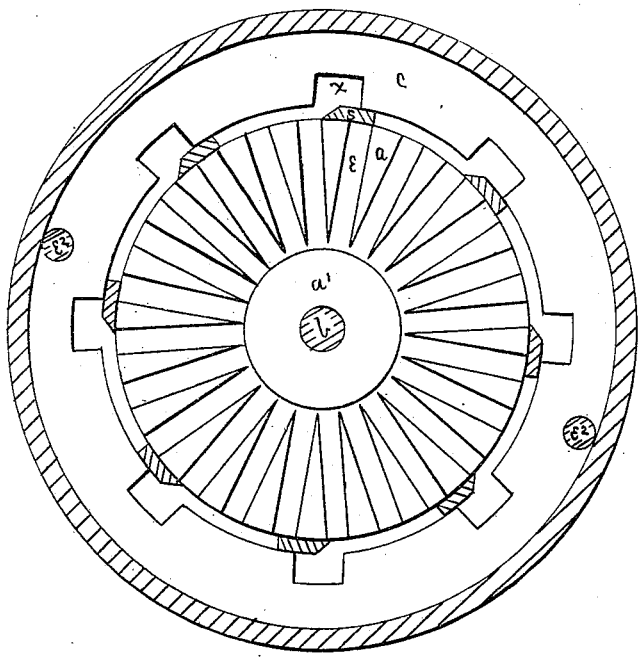

2 Sheets—Sheet 2.

W. EBERHARD.
Oatmeal-Machine.

No. 228,520. Patented June 8, 1880.

Witnesses
George T. Roberson
Joseph D. Horton

Inventor
William Eberhard
by Bradford Howland
Attorney

UNITED STATES PATENT OFFICE.

WILLIAM EBERHARD, OF AKRON, OHIO.

OATMEAL-MACHINE.

SPECIFICATION forming part of Letters Patent No. 228,520, dated June 8, 1880.

Application filed February 20, 1880.

*To all whom it may concern:*

Be it known that I, WILLIAM EBERHARD, of Akron, Ohio, have invented a new and useful Improvement in Oatmeal-Machines, of which the following is a specification.

My invention relates to that class of oatmeal-machines by which the grain is cut into coarse particles of meal.

The object of my invention is to force, or aid in forcing, the oats endwise to the knives which sever them through radial grooves in a rotating disk by means of a scroll-plate or disk having one side provided with slight ridges at an inclination to said radial grooves to force the oats through the grooves by contact of the oats with the ridges of the plate; also, to fasten parts of the machine together by a pin provided with a recess in which rests a removable spring-slide, which acts as a head to the pin.

Figure 3:
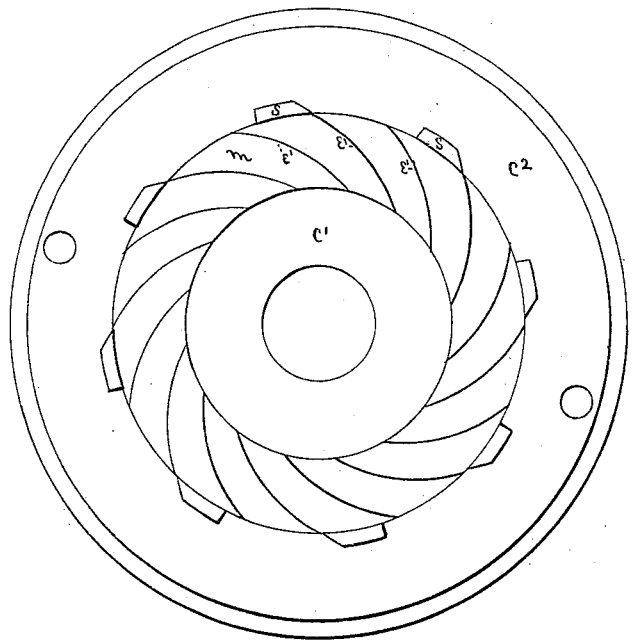
Figure 4:
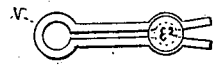

Figure 1 is a vertical section of the principal parts of the machine. Fig. 2 is a longitudinal section at the dotted line 1 in Fig. 1. Fig. 3 is a view of the under side of the scroll-plate. Fig. 4 represents detached parts.

The vertical shaft $b$ of the radially-grooved disk $a$ is rotated in the ordinary manner by means of a pulley and suitable gearing. Disk $a$ is firmly compressed between collars $a'$ $a^2$ by turning nut $n$ on a threaded part of shaft $b$, and thereby prevented from turning loose on its shaft, collar $a^2$ being keyed to the shaft.

Disk $a$ has its upper side provided with radial grooves $e$, extending from collar $a'$ to the circumference of the disk. Its grooves are covered by scroll-plate $m$, which is bolted to the bottom of cap $c'$. The cap and scroll-plate have a central opening for the admission of grain to disk $a$.

Grooves $e$ are of suitable dimensions to loosely hold the oat-kernels only lengthwise of the grooves; but at or near collar $a'$ it is preferable that their depth should be very slight, for the purpose of allowing the oats which are fed through the central opening in cap $c'$ on collar $a'$ to pass from thence on disk $a$ in any position, and to become adjusted, after reaching the disk, to a position lengthwise of grooves $e$.

The wedge-shaped projections on disk $a$, formed by and between grooves $e$, being thin and of slight depth where the oats fall on them, aid in adjusting the oats to grooves $e$ by the rotation of disk $a$ beneath the stationary scroll-plate $m$. The plate $m$ covers grooves $e$, and retains the grain in them, while the slight ridges $e'$, inclined outwardly in the direction of motion of disk $a$, aid in moving the oats outward through grooves $e$ to knives $s$.

Each ridge $e'$ extends from the inside to the outside of plate $m$, and may be straight; but they are preferably curved, so as to have the same inclination throughout their length to the radial grooves $e$.

Cap $c'$ has a sleeve, $c^2$, which is fastened by pin $e^2$ to frame $f$. Pin $e^2$ is fast in frame $f$, and at the upper side of the flange of sleeve $c^2$ has an annular recess, $s'$. By sliding the double spring $v$ into recess $s'$ the sides of the spring are pressed apart by pin $e^2$ until the parts of the spring which form a circular opening close around pin $e^2$ in the recess $s'$, and thus fasten down sleeve $c^2$. When spring-slide $v$ has been drawn away from pin $e^2$ all the parts of the machine above disk $a$ may be lifted and removed together.

Sleeve $c^2$ is grooved across its inner circumference to admit knives $s$ between it and cap $c'$, where the knives are adjustably held against cap $c'$ by set-screws $g$ through sleeve $c^2$.

Knives $s$ may be of any desired length, their upper ends projecting above cap $c'$, and their cutting-edges extending downward across the circumference of disk $a$ and close to the outer ends of grooves $e$.

By the rotation of disk $a$ the oats projecting beyond the outer ends of grooves $e$ are severed by contact with knives $s$. The circular vessel or cup $w$, beneath disk $a$, and into which the meal falls from knives $s$, is bolted to frame $f$, and forms a part of the frame of the machine. Its inside diameter is enough greater than the diameter of disk $a$ to allow space for the meal to fall into it from the circumference of the disk.

Gage-ring $c$ is placed between sleeve $c^2$ and frame $f$, where it is held by pins $e^2$. The inside circumference of gage-ring $c$ is opposite the outer ends of grooves $e$, and the distance between it and the ends of the grooves determines the length of the particles of meal. It arrests the outward movement of the grain projecting from grooves *e* until the kernels are severed by knives *s*. It has openings *x* for knives *s* to enter and for the meal to fall through into cup *w*.

By the rotation of shaft *b* a wing or scraper, *o'*, attached to the bottom of collar $a^2$, forces the meal into a discharge-spout in the bottom of vessel *w*.

I claim as my invention—

In an oatmeal-machine, the stationary disk or plate *m*, provided with ridges *e'*, inclined to the radius of the disk, in combination with the revolving disk *a*, provided with radial, or nearly radial, grooves *e*, extending to the circumference of disk *a*, and of suitable width and depth to loosely hold oat-kernels only lengthwise therein, the two disks being in such proximity to each other as to prevent the kernels from escaping laterally from the grooves and becoming crushed between the disks, and the ridges being inclined to the grooves for the purpose of permitting centrifugal force to move the kernels endwise through them to the circumference of disk *a*, substantially as described.

WILLIAM EBERHARD.

Witnesses:
BRADFORD HOWLAND,
A. D. KNAPP.